B. W. TUCKER.
TUBE MAKING MACHINE.
APPLICATION FILED FEB. 8, 1904.

994,801.

Patented June 13, 1911.
11 SHEETS—SHEET 4.

Attest:
P. B. Philipp
O. Itehot

Inventor:
Benjamin W. Tucker
by Philipp Sawyer Rice & Kennedy
Attys

B. W. TUCKER.
TUBE MAKING MACHINE.
APPLICATION FILED FEB. 8, 1904.

994,801.

Patented June 13, 1911.
11 SHEETS—SHEET 8.

B. W. TUCKER.
TUBE MAKING MACHINE.
APPLICATION FILED FEB. 8, 1904.

994,801.

Patented June 13, 1911.
11 SHEETS—SHEET 9.

UNITED STATES PATENT OFFICE.

BENJAMIN W. TUCKER, OF NEWARK, NEW JERSEY, ASSIGNOR TO THE AMERICAN TOBACCO COMPANY, OF NEW YORK, N. Y., A CORPORATION OF NEW JERSEY.

TUBE-MAKING MACHINE.

994,801. Specification of Letters Patent. Patented June 13, 1911.

Application filed February 8, 1904. Serial No. 192,628.

*To all whom it may concern:*

Be it known that I, BENJAMIN W. TUCKER, a citizen of the United States, residing at Newark, county of Essex, and State of New Jersey, have invented certain new and useful Improvements in Tube-Making Machines, fully described and represented in the following specification and the accompanying drawings, forming a part of the same.

This invention aims especially to provide a machine for making mouthpieces for cigarettes or cigars, formed by rolling a blank of paper or other suitable material to form a tapering or conical tube open at both ends, and treating the tube thus formed with paraffin or other suitable material; although the invention may be employed for forming tubes for other purposes and parts of the invention may be used independently of other parts, and parts are applicable to making tubes other than conical tubes.

A complete machine embodying all features of the invention includes means for intermittently advancing a web of material, cutting lengths therefrom to form blanks, applying paste or other adhesive to one edge of the blanks, forming the blanks into conical tubes, transferring the tubes to an intermittently advancing carrier, applying paraffin or other suitable material to the small end of the tubes, and delivering the tubes from the carrier after the paraffin has had time to set; and the invention includes various features relating to means for performing these various operations and to the complete organization of a machine for successively performing such operations automatically.

A full understanding of the invention can best be given by a detailed description of a preferred form of machine constructed to embody the various features of the invention, and such a description will now be given in connection with the accompanying drawings, showing such a machine.

In said drawings.

Referring to the drawings: The various parts of the machine are supported by a stand or pedestal 10 and a table 11 carried by the pedestal, on which table is mounted the main driving shaft 12. The shaft 12 is as shown, driven from a loose pulley 13 through a clutch member 14 keyed to the shaft but free to move longitudinally thereon and operated by means of a hand wheel 15 acting through a lever 16.

The machine will be described by following the operations from the time the paper enters the machine until the completed mouthpieces are discharged therefrom.

Figure 1:
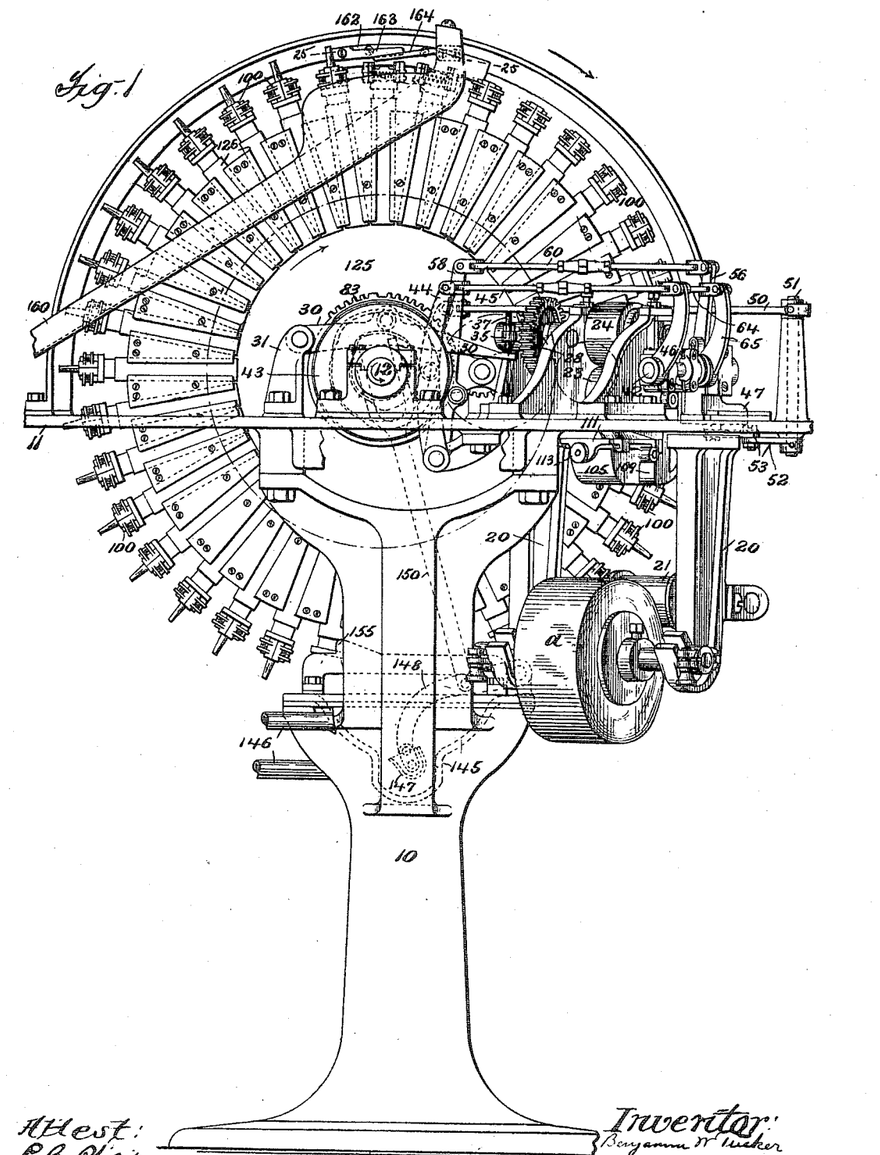
Figure 1 is a side view of the machine looking in the direction of the arrow 1 in Fig. 2.
Figure 2:
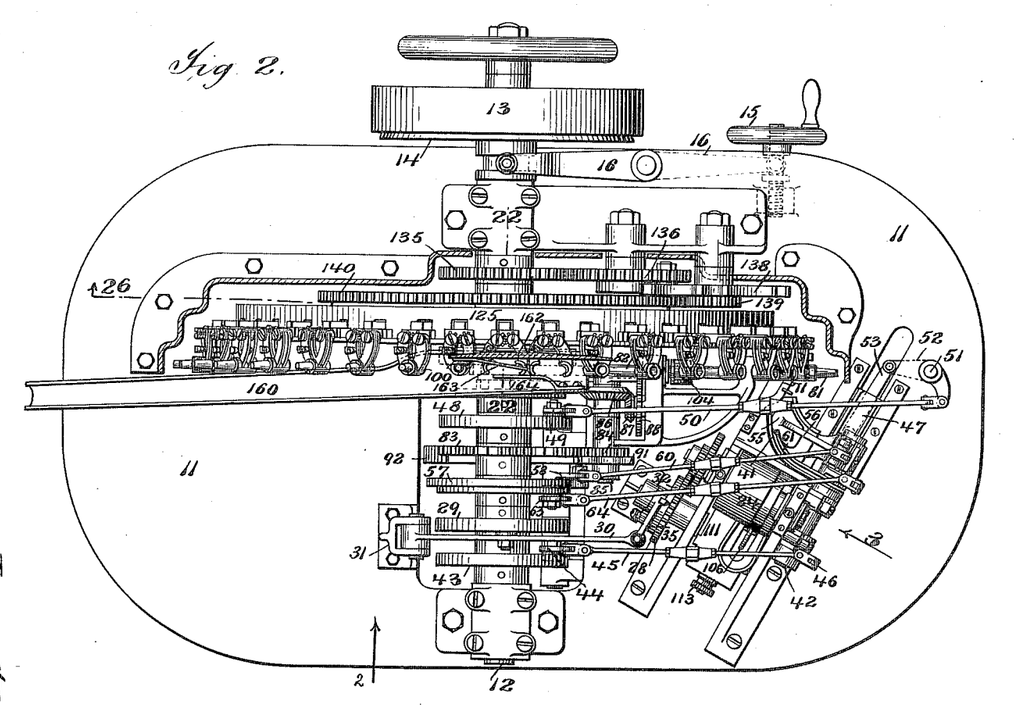
Fig. 2 is a plan view of the machine with parts shown in section.
Figure 3:
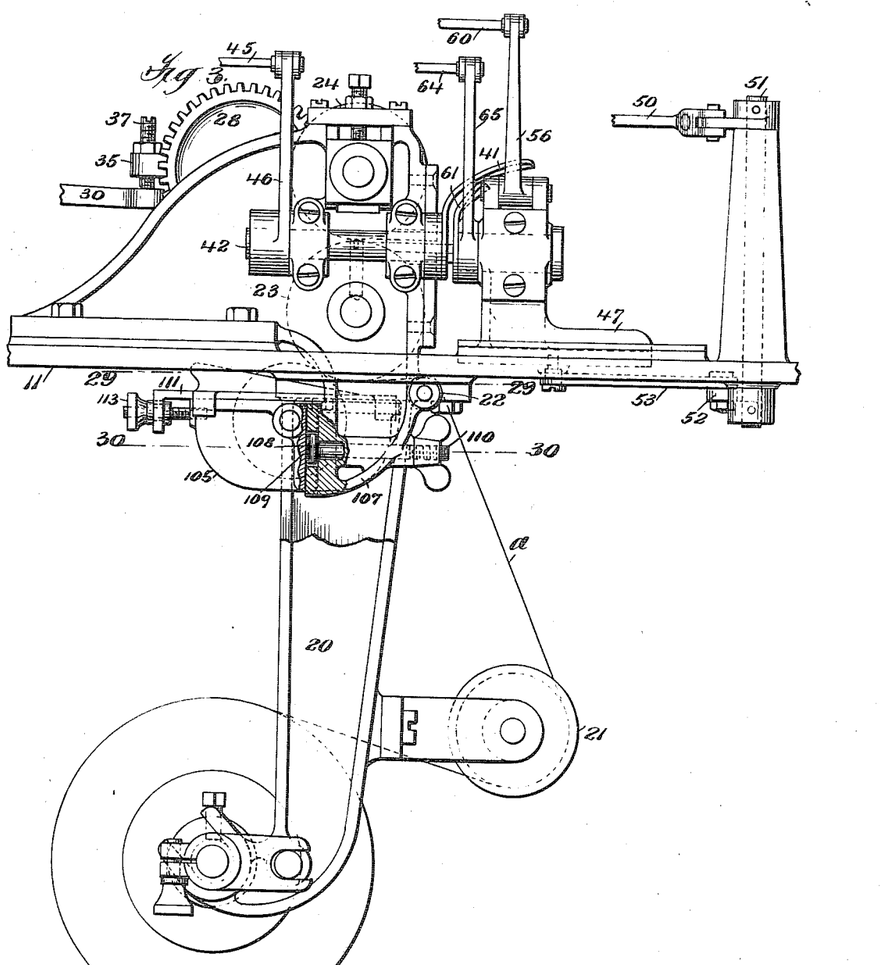
Fig. 3 is a partial elevation looking in the direction of the arrow 3 at Fig. 2.
Figure 4:
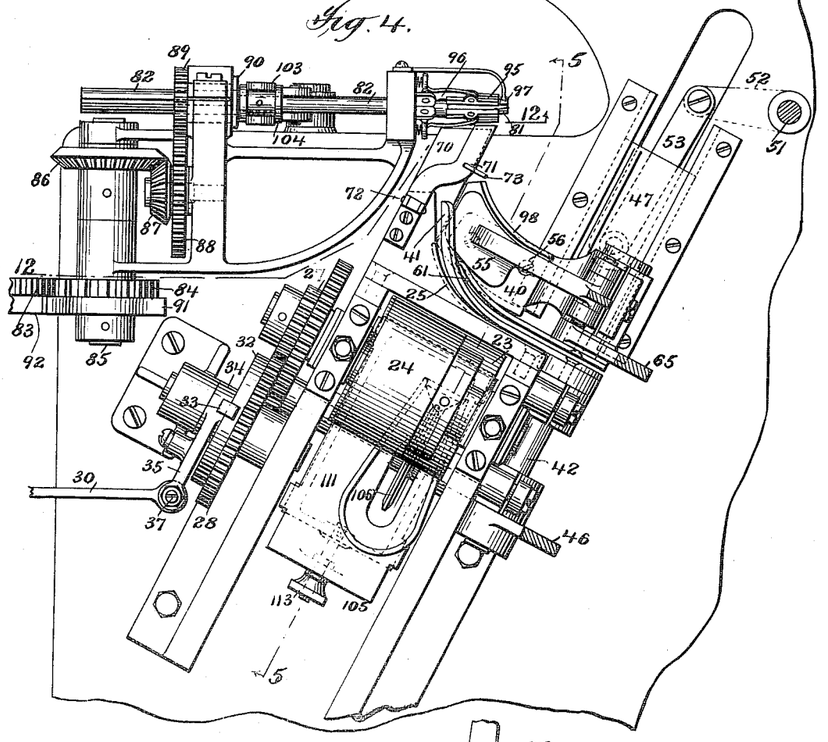
Fig. 4 is a plan of the parts shown in Fig. 3.

In the machine as shown, the blanks are formed by cutting successive portions from a web of material *a*. The web roll is supported in suitable bearings in hangers 20 depending from the table 11, and the web passes about guide rolls 21 and 22 to a feed roll 23 and then passes between said feed roll and a co-acting feed roll 24, which rolls are rotated intermittently to advance successive lengths of material over a table 25 and beneath the guide 26. The feeding rolls may be intermittently rotated by any suitable means. As shown, the rolls are geared together and the shaft of the roll 24 carries a pinion 27 meshing with a gear 28 which is intermittently rotated from a cam 29 on the shaft 12 by means of a lever 30 pivoted to a bracket 31 and carrying an anti-friction roll running in the groove of the cam 29. Any suitable means might be employed for giving an intermittent rotation to the gear 28 from the reciprocating movement of the lever 30. A clutch suitable for this purpose is shown in Fig. 4 and in dotted lines of Fig. 5 where the gear 28 is shown as carrying an annular flange 32 which is engaged by clutch pawls 33 connected by springs to a collar 34 mounted concentrically with the gear 28 and the inner ends of which pawls engage notches on said collar. The collar 34 carries an arm 35 which is held in engagement with the end of the lever 30 by means of the spring 36. The arm 35 will thus be oscillated in accordance with the movement of the lever 30 and will oscillate the collar 34 and the pawls will rotate the gear 28 when the collar moves in one direction and will slide over the flange 32 when the collar moves in the other direction, the arm 35 preferably pressing against the lever 30 by means of an adjustable bearing screw 37.

At each feeding movement of the rolls 23 and 24, a length of material will be advanced from the table 25 over a transferring table or carriage 40 by which the blanks after being severed from the web are advanced to the forming mandrel. After the blank length of material has been advanced over the transferring table 40, it is separated from the web by means of a knife 41. This knife, as shown, is carried by a short shaft 42 and co-acts with the edge of the table 25 for severing the material. The shaft 42 is rocked for giving the knife its cutting and return movements by means of a cam 43 through a lever 44 having an anti-friction roll running in the cam groove and connected by link 45 with an arm 46 on the shaft 42. The transferring table 40 is carried by a slide 47 mounted to move longitudinally of the direction in which the material is fed by the feeding rolls, and which, as shown, is given its movement from a cam 48 on the shaft 12 by means of a lever 49 having an anti-friction roll running in the groove of the cam 48 and connected by a link 50 with an arm on a vertical shaft 51 which has another arm 52 connected beneath the table with the slide by a link 53.

Mounted to move with the table 40 is a clamping plate 55 adapted to clamp the blank on the table. This clamping plate, as shown, is carried by a pivoted arm 56 which is oscillated to carry the clamping plate into and out of clamping position by means of a cam 57 on the shaft 12 acting through a lever 58 carrying an anti-friction roll which is held in contact with the periphery of the cam by means of a spring 59, said lever being connected by a link 60 with an upward extension of the arm 56. Also mounted to move with the transferring table 40, is a second knife 61 which acts to further shape one edge of the blank after the blank has been severed from the web. This knife, as shown, is pivotally mounted and co-acts with the rear edge of the table 40 and is given its cutting and return movements by means of a cam groove 62 in the face of the cam 57, said cam acting through a lever 63 and carrying an anti-friction roll running in the cam groove 62 and connected by a link 64 with an arm 65 by which the knife 61 is actuated.

Figures 33, 34, 35, 36, 37, 38, 39:
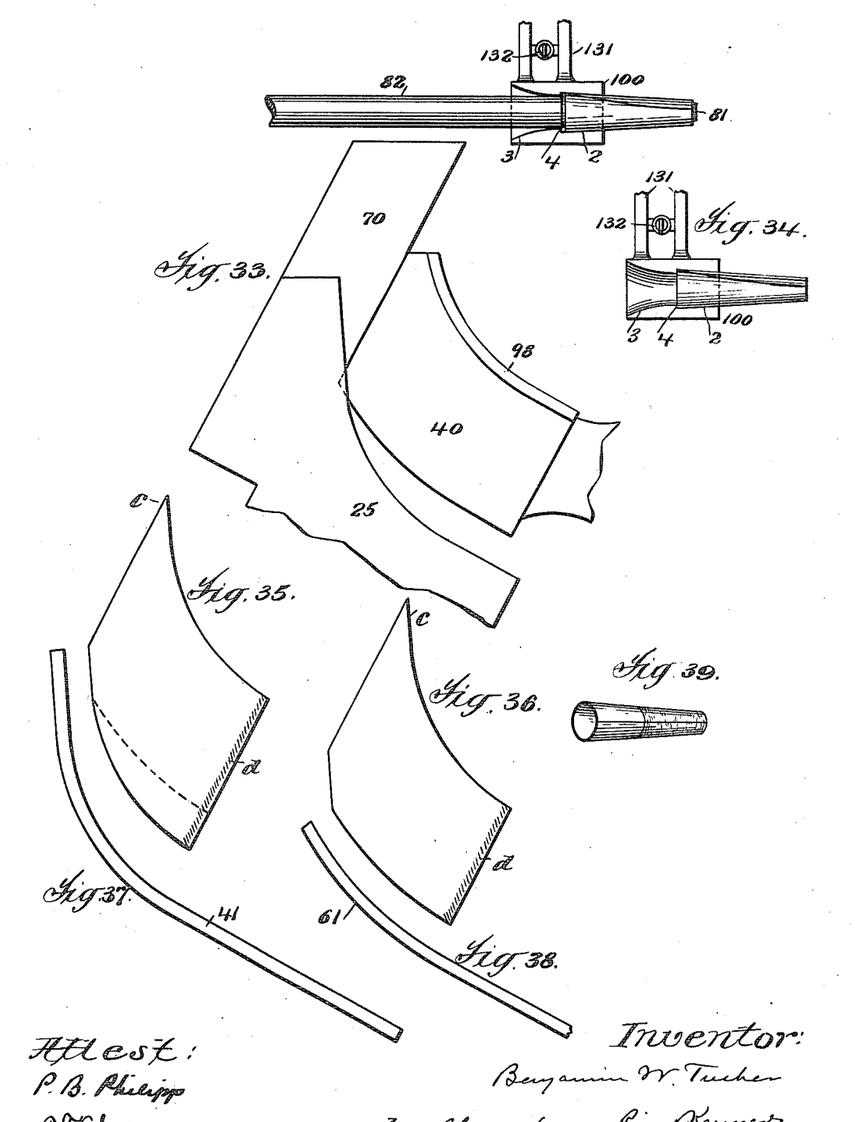
Fig. 33 is a similar view of the same parts in different positions.
Fig. 34 is a detail showing one of the holders of the tube carrier with a tube in position therein.
Fig. 35 shows a partially formed blank.
Fig. 36 shows a completely formed blank.
Figs. 37 and 38 show the form of the knives for making the first and second cuts for forming the blanks.
Fig. 39 shows a completely formed mouthpiece.

A blank length of the material having been advanced by the feeding rolls over the transferring table 40, it is severed from the web by the knife 41 and clamped on the table by the clamp 55. The piece thus severed from the web will be of the form shown by full lines in Fig. 35, having a concavely curved forward edge formed by the previous cut of the knife 41. The table 40 is then given its forward movement to advance the blank to the forming mandrel, and the knife 61 acts to cut the blank on the dotted line shown in Fig. 35, cutting a tapering piece from the convexly curved rear edge of the blank and thereby completely forming the blank as shown in Fig. 36. This cut is necessary in order to produce a blank which when rolled on the tapering forming mandrel will form a tube in which the edges of the superposed layers of the large end will coincide. If the blank were rolled up when of the form shown in Fig. 35, the edges of the superposed layers at the large end of the tube would successively project one beyond the other. After the transferring table is moved into position to present the blank to the forming mandrel, the clamping plate 55 is raised to release the blank and permit it to be drawn from the table as it is rolled about the forming mandrel. The table is then returned to its receiving position, the clamping plate remaining in its raised position until another blank length has been fed over the table.

For preventing the tapering piece cut from the blank from sticking to the knife, a freeing finger 66 is preferably provided adjacent to the rear edge of the table and in position to bear against the knife as it cuts through the blank, and such freeing finger is preferably carried by a pivoted arm 67 spring pressed to carry the finger toward the table.

Figure 5:
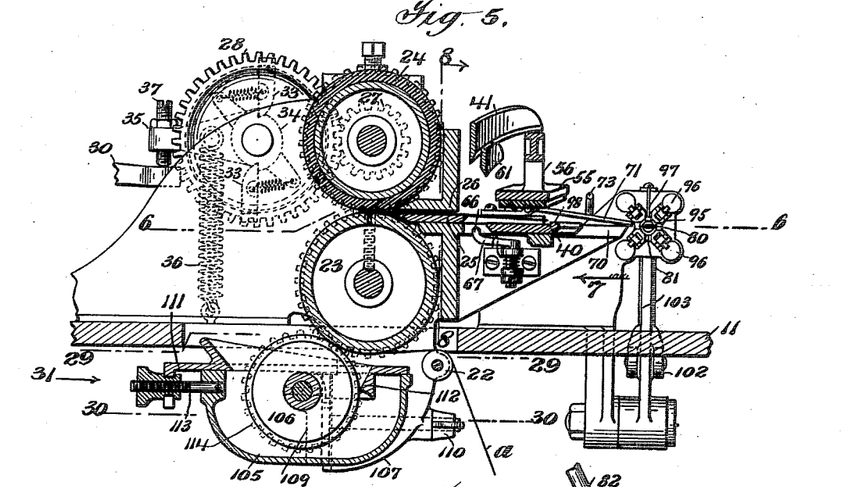
Fig. 5 is a section on line 5 of Figs. 4 and 6.
Figure 6:
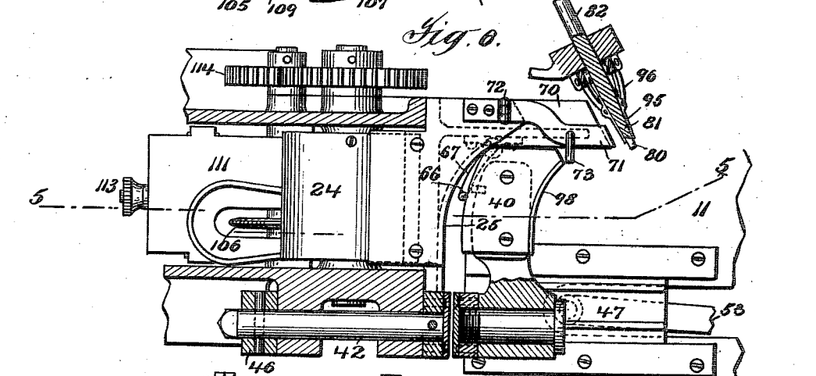
Fig. 6 is a section on line 6 of Fig. 5.
Figure 7:
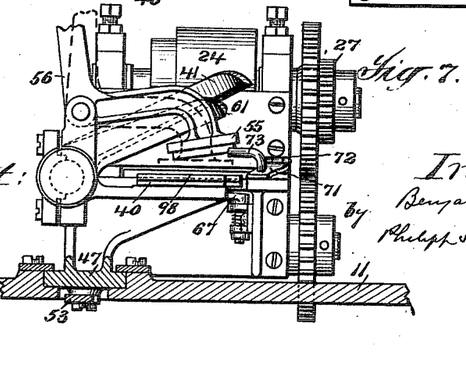
Fig. 7 is a view looking in the direction of the arrow 7 on Fig. 5, omitting the forming mandrel.
Figure 8:
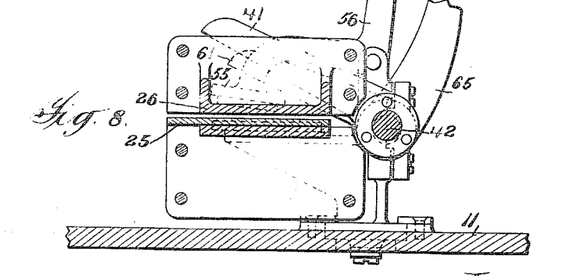
Fig. 8 is a section on line 8 of Fig. 5.
Figure 9:
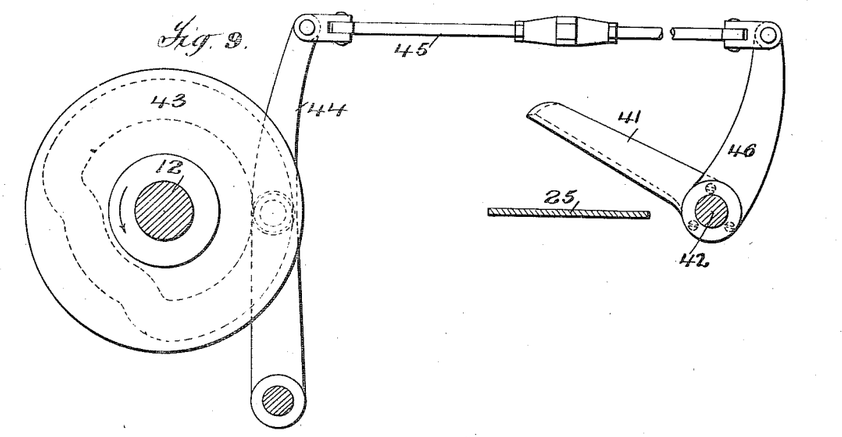
Figs. 9, 10 and 11 are details showing the cams and connections for operating various parts.
Figures 10, 11:
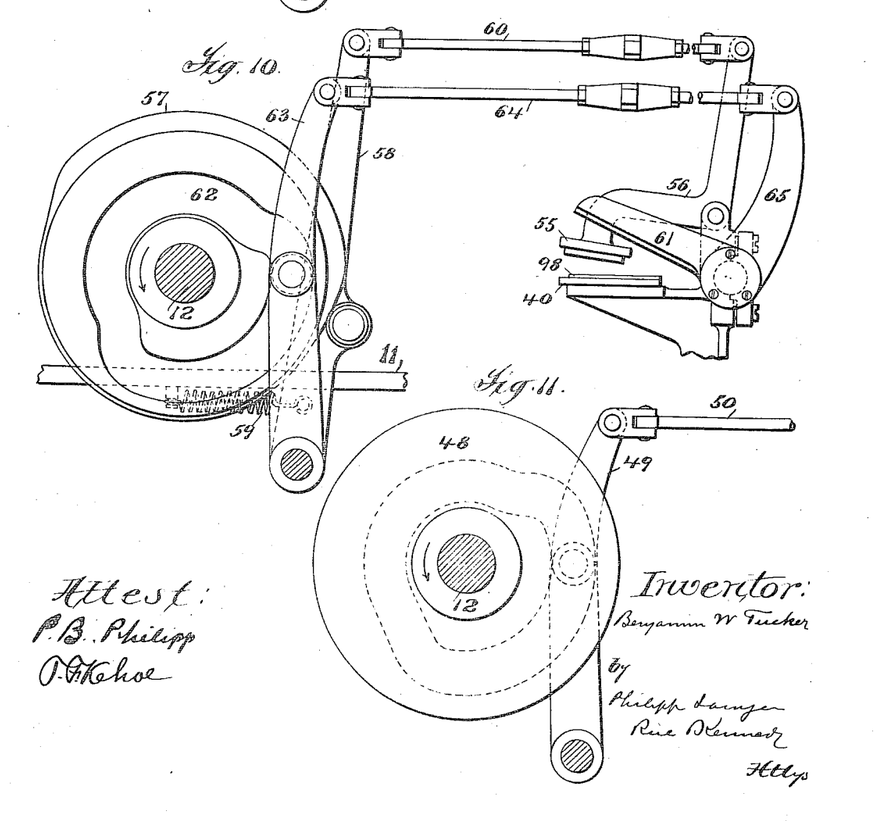

The table 40 is preferably of a less width than the width of the web of material and a stationary guide or support 70 is provided over which the edge of the blank moves as the blank is advanced by the transferring table. An upper guide 71 is also preferably provided above the support 70 for insuring the entrance of the point of the blank into a slot in the forming mandrel, as hereinafter described. This guide 71 is preferably pivoted at a slight distance above the plane of the support 70, as at 72, and allowed to bear at or near its free end yieldingly against the guide 70 so as to form a tapering guideway for the edge of the blank, as shown in Fig. 5. After the point of the blank has been inserted in the slot of the forming mandrel, the guide 71 is raised to leave the blank free to be drawn forward by the rotation of the spindle. For this purpose the guide 71 is preferably provided with a pin 73 in position to extend over the clamping plate 55 when the latter has been moved forward with the table 40. As the clamping plate rises, it will engage this pin 73 and thereby raise the guide 71.

By the forward or presenting movement of the transferring table 40, the point c of the blank is entered into a slot 80 in the hollow end of a tapering forming mandrel 81, which is then rotated to wind the blank about itself to form the tapering or cone shaped tube. The mandrel 81 is carried by a shaft or spindle 82 which is rotated intermittently by suitable means, being given at each movement a number of rotations. Any suitable means may be provided for intermittently rotating the shaft 82. As shown, it is rotated from a mutilated gear 83 on the shaft 12 which engages a pinion 84 on a shaft 85 which shaft also carries a bevel gear 86 meshing with the bevel gear 87 on a stud which also carries a gear 88 engaging a pinion 89 carried by a sleeve 90 mounted in suitable bearings and within which the shaft 82 is splined so as to be free to move longitudinally therein while being driven thereby. For locking the spindle against rotation between the periods of its movement, a locking plate 91 is provided on the shaft 85 having a concave face or faces to engage a segmental flange 92 on the gear 83, said flange extending between the ends of the tooth segment of the gear and being cut away opposite the gear teeth. The shaft 85 will thus be free to rotate while the teeth of gear 83 are in engagement with the gear 84, and will be locked against rotation after the teeth of gear 83 have moved beyond the gear 84 and until they are next in engagement therewith. As shown, the tooth segment of the gear 83 is of a length sufficient to rotate the gear 84 one and a half times, and the connecting gearing, as shown, is proportioned to rotate the forming mandrel six times for each revolution of the shaft 12.

Figures 12, 13, 14, 15, 16, 17, 18, 19, 20, 21:
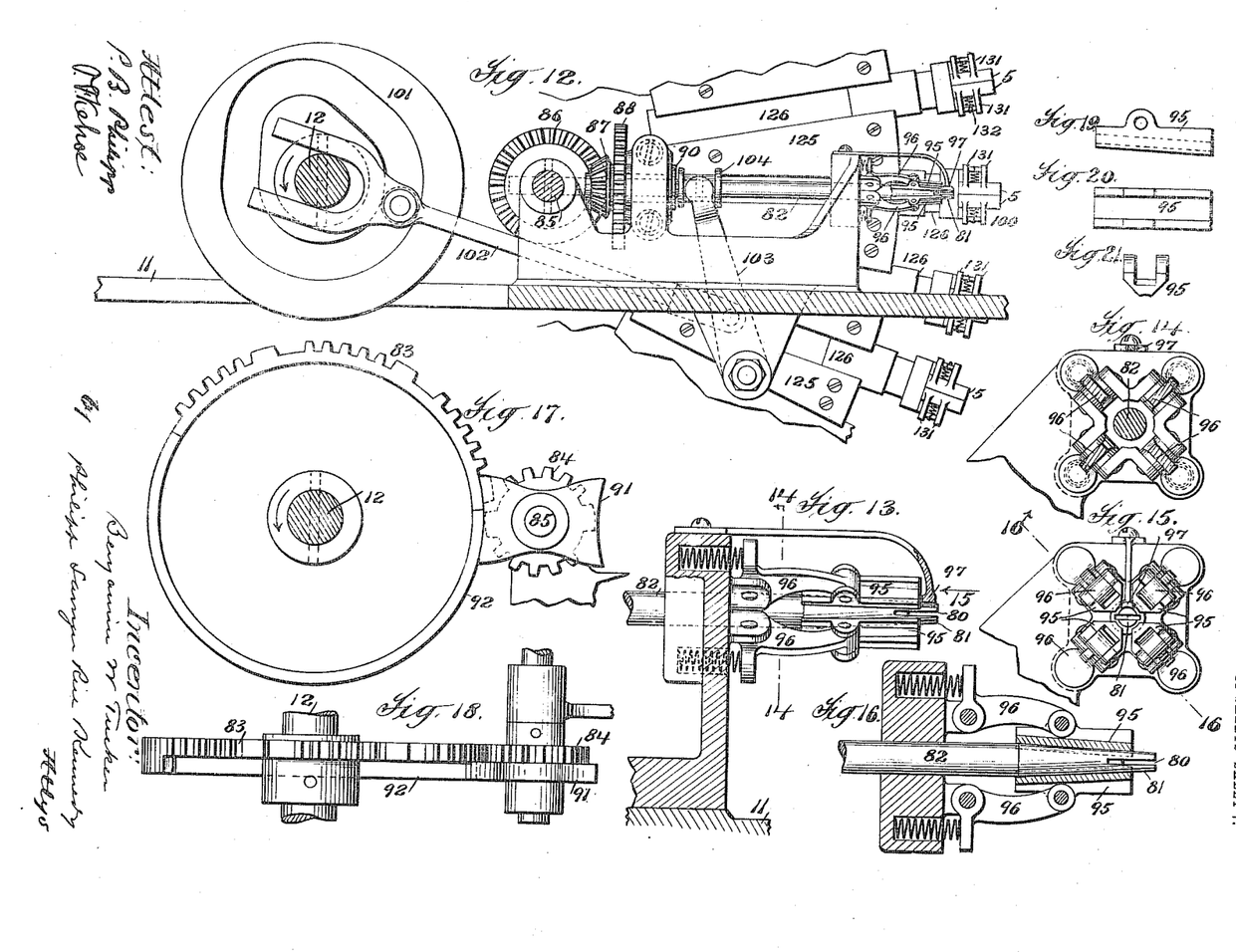
Fig. 12 is a section taken on line 12 of Fig. 4, showing also the cam and connections for reciprocating the forming mandrel.
Fig. 13 is an enlarged detail side view of the forming mandrel and coöperating parts.
Fig. 14 is a section on line 14 of Fig. 13.
Fig. 15 is an end view of the parts shown in Fig. 13.
Fig. 16 is a section on line 16 of Fig. 15.
Figs. 17 and 18 are side and plan views respectively of the gears for intermittently rotating the forming mandrel.
Figs. 19, 20 and 21 are details of one of the pressing shoes for coöperating with the forming mandrel in rolling the blank about the mandrel.

For smoothing and holding the blank tightly against the forming mandrel as the mandrel rotates, suitable pressing means is preferably provided. For this purpose self-adjusting pressing shoes 95 are provided carried by pivoted spring pressed arms 96. Preferably four such shoes are provided, arranged about the mandrel as shown in Figs. 14 and 15. The pressing shoes 95 preferably do not extend quite to the end of the forming mandrel, and a spring mounted pressing finger 97 is preferably provided adjacent to the portion of the mandrel beyond the shoes 95, as shown in Figs. 12 and 13. This pressing finger 97 serves to smooth and press against the end portion of the mandrel the part of the blank wound thereon, and also serves as an auxiliary stripping means for pushing the tubes from the mandrel in case the main stripping means hereinafter described, fails in its operation.

For guiding the blank as it is drawn from the transferring table and wound on the mandrel, a guide is provided to engage the concave edge of the blank, and such guide is preferably formed by a flange 98 on the transferring table preferably curved to correspond with the edge of the blank. Such guide will insure a proper edgewise or horizontal swinging of the blank to secure an even winding of the same on the tapering mandrel.

After the tube or mouthpiece has been formed on the mandrel, the mandrel shaft 82 is moved longitudinally to carry the mandrel forward to advance the mouthpiece to one of a series of intermittently moving holders 100, the arms 96 moving outward against their spring tension as the shoes are forced apart by the advance of the mandrel, and the spring finger 97 also yielding. The shaft 82 may be reciprocated longitudinally by any suitable means, but as shown it is given this movement from a cam 101 on shaft 12 (see Fig. 12) acting through a pitman 102 pivotally connected to a lever 103 and having its other end forked to straddle the shaft 12 and carrying an anti-friction roll running in the groove of the cam 101. The lever 103 has a forked end engaging a spool 104 on the shaft 82.

Figure 29:
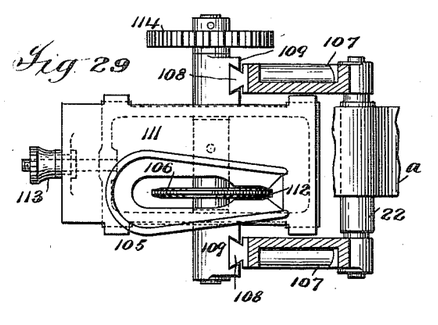
Figs. 29 and 30 are detail sectional views taken on lines 29 and 30 respectively of Figs. 3 and 5.
Figure 30:
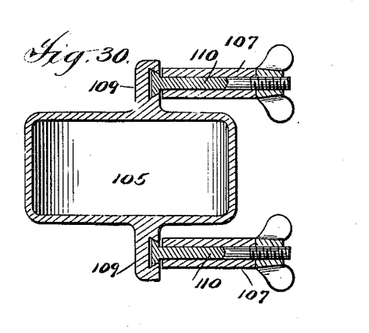
Figure 31:
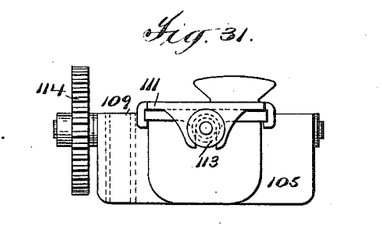
Fig. 31 is a view of the paste fountain, looking in the direction of the arrow 31 of Fig. 5.
Figure 32:
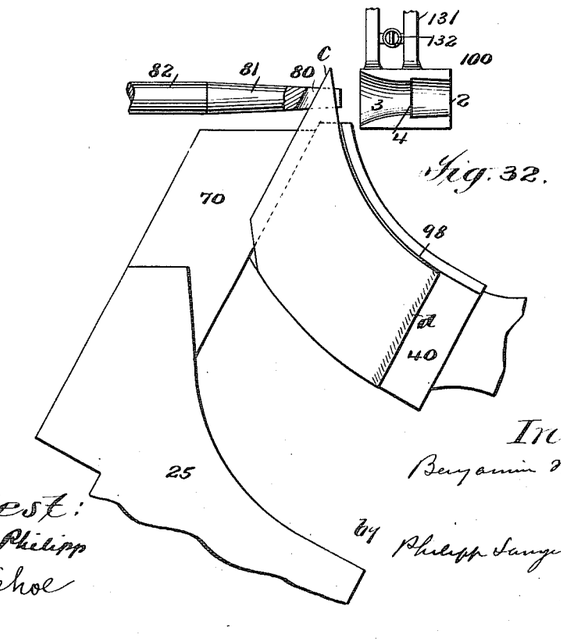
Fig. 32 is a diagrammatic plan view showing the forming mandrel, the blank presenting means and one of the holders of the tube carrier.

Means are preferably provided for applying to the blanks a line of paste at the edge $d$, as shown in Figs. 32, 35 and 36, for securing this edge of the blank to the body of the tube when the tube has been formed about the mandrel. This line of paste is preferably applied to the web before the blank lengths are cut therefrom, and for this purpose I have shown pasting mechanism comprising a fountain 105 having a pasting wheel 106 mounted to rotate partly therein and to engage the edge of the blank web as the latter turns about the feeding roll 23. This paste fountain is shown as supported by and adjustable vertically on hangers 107 depending from the table 11. For the purpose of providing for such adjustment, the hangers are provided with dovetailed flanges 108 extending into dovetailed grooves formed in outward projections 109 of the fountain (see Figs. 29 and 30), and the fountain is clamped in any position to which it has been adjusted, by means of bolts 110 having heads extending into said dovetailed grooves in recesses of the dovetailed flanges. The fountain is provided with a cover 111 having an opening for the paste wheel, the edges of which opening form a scraper 112 for the upwardly moving side and edge of the paste wheel (see Fig. 29). This cover is fitted to move transversely to the shaft of the paste wheel so as to be adjustable, as by means of a thumb screw 113, for moving the scraper closer to or farther from the periphery of the paste wheel to regulate the amount of paste to be applied to the web. The paste wheel is driven by means of a gear 114 meshing with a gear on the shaft of the feed roll 23.

Figures 22, 23, 24, 25:
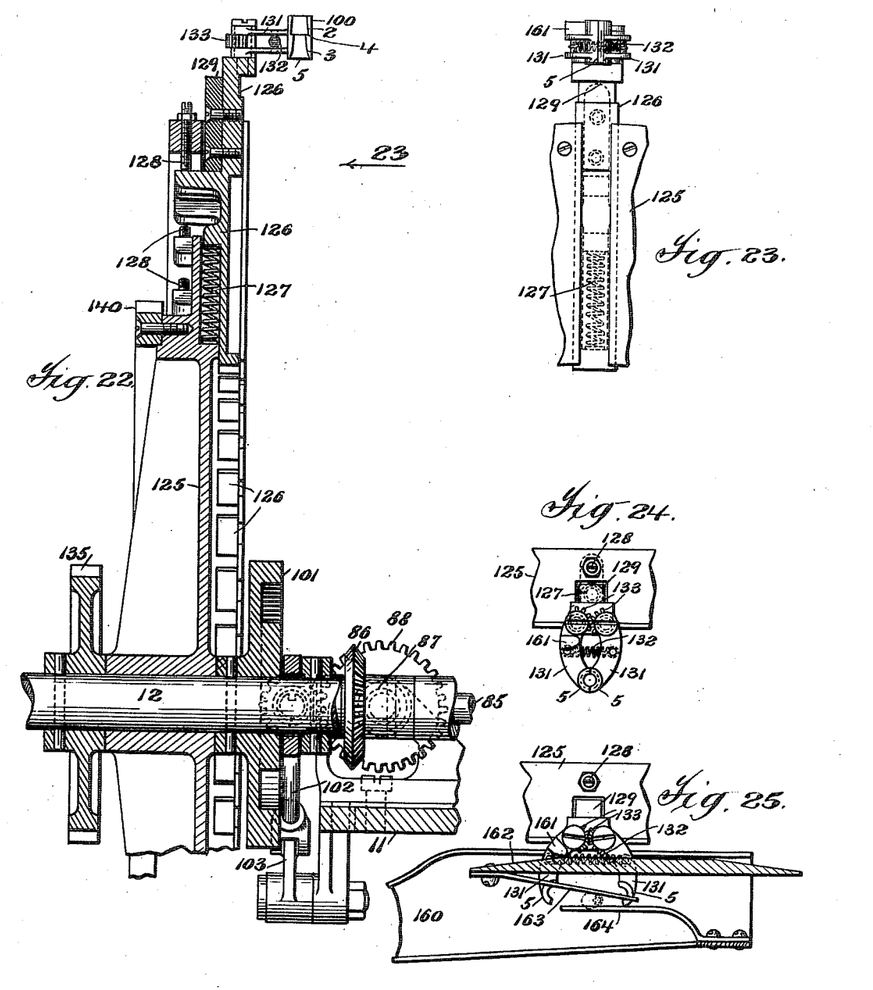
Fig. 22 is a broken sectional view showing the tube carrier taken on line 22 of Fig. 2.
Fig. 23 is a broken detail view looking in the direction of the arrow 23 on Fig. 22.
Fig. 24 is a plan view of the parts shown in Fig. 23.
Fig. 25 is a detail sectional view taken on line 25 of Fig. 1.

Any suitable means may be provided for receiving the rolled up mouthpieces from the forming mandrel. I preferably provide, however, a plurality of holders carried by an intermittently moving carrier by which holders the mouthpieces are received from the forming mandrel, transferred to the paraffin applying means and then transferred to the discharging means after the paraffin has been allowed time to set. The carrier is preferably a rotary carrier, and as shown, consists of a disk 125 mounted free to rotate on the shaft 12 and provided with a plurality of radially movable supports 126. Each of the supports 126 is independently pressed radially outward by means of a spring 127 against a suitable stop, preferably an adjustable stop 128, and each of the supports has a shoulder 129 for a purpose hereinafter pointed out, this shoulder being preferably formed by means of a removable block as shown in Fig. 22, so as to permit the shoulder to be renewed if it becomes worn or if it is desired to change its position. Each of the supports 126 carries a holder 100 for receiving the rolled mouthpieces from the forming mandrel. The carrier is preferably arranged to rotate vertically on a horizontal axis and the holders arranged radially of the carrier so that the mouthpieces may be carried into vertical position to have paraffin applied to small ends. The holders are preferably formed as shown by means of two members 5, each formed with a semi-cylindrical groove and each carried by an arm 131 pivotally mounted on the support and under tension to move toward each other as by means of a spring 132. The holder members 5 will thus be held normally in holding position, as shown in Fig. 24, but will be capable of being moved away from each other. To insure uniform movement of the two arms 131 and the proper positioning of the holders, the arms are preferably provided with intermeshing gear segments 133, as shown. Each of the holder members 5 has its groove formed with a tapering holding portion 2 and a tapering entering portion 3 and with a shoulder 4 separating the holding portion from the entering portion.

After each movement of the disk 125, one of the holders 100 is brought in line with the forming mandrel and to position to have a mouthpiece inserted into it by the longitudinal inserting movement of the mandrel as shown in Figs. 12 and 32. As the mandrel moves forward after the winding of the mouthpiece has been completed, the mouthpiece is carried small end first between the holder members 5, the holder members yielding to permit the large end of the mouthpiece to pass through the entrance portion of the holder and then snapping back to bring the shoulders 4 back of the large end of the mouthpiece, as shown in Fig. 33. The mandrel being then retracted, the mouthpiece will be left in the holder in the position shown in Fig. 34. The disk 125 then making another movement, the holder which has received the mouthpiece will be advanced one step and the succeeding holder moved into position to receive a mouthpiece on the next forward movement of the mandrel. If for any reason the mouthpiece should not be held by the holder as the mandrel is retracted, it will be stripped from the mandrel by the finger 97.

Any suitable means may be provided for giving the disk 125 an intermittent rotation. As shown, the disk is driven from a gear 135 on the shaft 12, which gear drives a gear 136 which carries a stud or anti-friction roll 137 to engage and intermittently rotate a slot wheel 138 which carries a pinion 139 meshing with a gear 140 carried by the disk 125. For locking the disk 125 between its intermittent movements, the periphery of the slot wheel 138 is formed concave between the slots for engagement by a flange 141 on the gear 136, said flange being cut away to permit movement of the slot wheel when the stud 137 is in engagement therewith.

Figures 26, 27, 28:
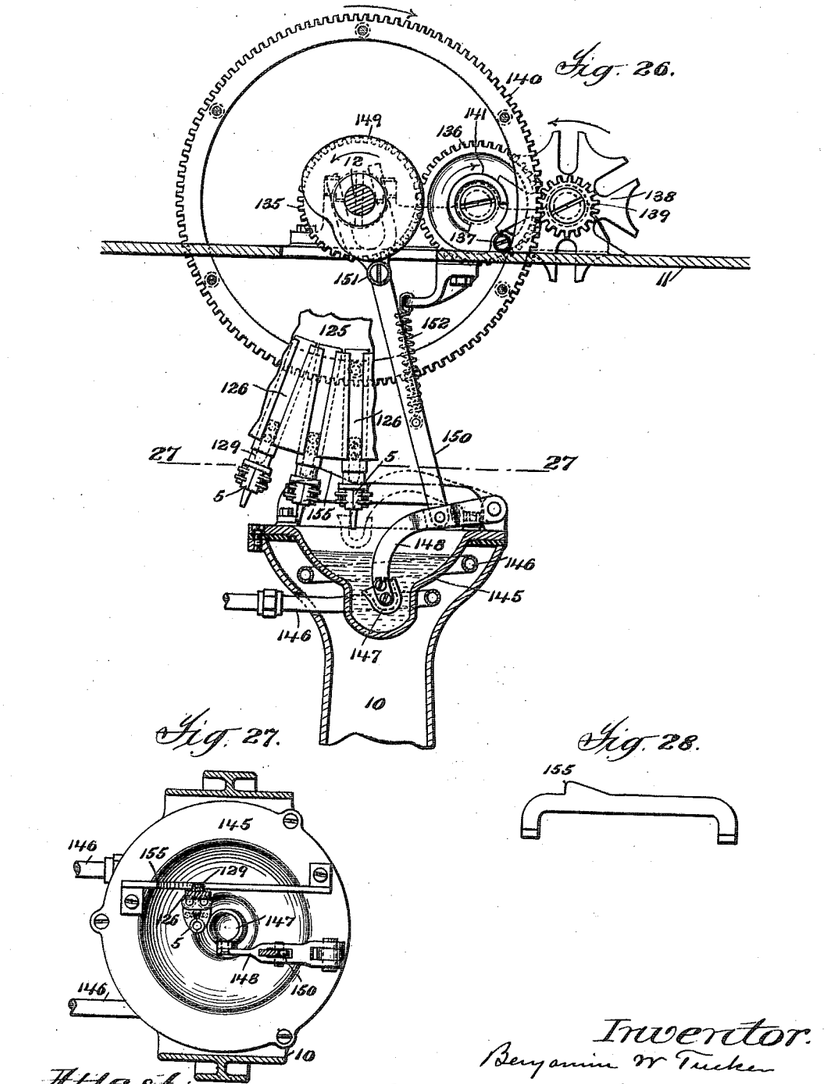
Fig. 26 is a broken sectional view taken on line 26 of Fig. 2 and showing the driving mechanism of the carrier and the paraffin applying mechanism.
Fig. 27 is a section on line 27 of Fig. 26.
Fig. 28 is a detail of a cam forming part of the paraffin applying mechanism.

It is desirable to apply paraffin or other suitable material to the small end of tubes intended to be used for cigar or cigarette mouthpieces. Any suitable means may be provided for this purpose, preferably, however, I provide means for applying the paraffin to the mouthpieces while they are carried by the holders 100. A preferred construction is shown in the drawings and especially in Figs. 26, 27 and 28, such mechanism comprising a receptacle 145 in which the paraffin is maintained in a molten condition by being heated, as by means of a steam coil 146, and a reciprocating dipper 147 which moves alternately down into the paraffin, as shown in full lines in Fig. 26, and then up to position shown in dotted lines in said figure for immersing the lower ends of the mouth piece tubes in the paraffin in the dipper, the mouthpiece tubes being by successive movements of the carrier 125 brought to position and held vertically to extend into the dipper when the latter is in its upper position. The dipper is reciprocated in time with the movements of the carrier 125. As shown, the dipper is carried by a pivoted arm 148 which is reciprocated from a cam 149 on the shaft 12 through a pitman 150 pivotally connected to the arm 148 and carrying an anti-friction roll 151 held in contact with the cam 149 by means of a spring 152, the cam end of the pitman being guided by means of a fork, as shown in Fig. 26.

It is preferable to provide means for freeing the mouthpieces from an excess of paraffin. For this purpose, the holders are mounted on the spring pressed movable supports 126 and a cam 155 is provided for engaging the shoulder 129 of the supports 126 to move the supports inward and then allow them to be forced suddenly outward by the springs 127 as the carrier moves forward after the paraffin has been applied to the mouthpieces. This sudden outward snap of the supports will effectually jar off any excess of paraffin which may have been applied to the mouthpieces. After the paraffin has been applied to the mouthpieces, the latter are again advanced step by step by the carrier and are preferably allowed to remain in the holders for a time sufficient to insure the drying or setting of the paraffin.

By making the holder carrier of a relatively large diameter and providing it with a considerable number of supports and holders, the mouthpieces may be allowed to remain in the holders for such sufficient time without affecting the speed of operation of which other parts of the machine are capable.

For discharging the mouthpieces from the holders, means are provided for separating the holder members to allow the mouthpieces to drop into a chute 160 from which they may be received in suitable receptacles or by suitable packing mechanism. For separating the holder members, one of the holder arms 131 is provided with a stud 161 which as the holders are brought into position for discharging the mouthpieces is engaged by a cam 162 and the holder arms thereby forced apart, as shown in Fig. 25. For insuring the delivery of the mouthpieces from the holders, a freeing rod 163 is preferably provided, and a rod 164 inclined to the rod 163 is preferably provided to co-act therewith.

It will be understood that the invention is not to be limited to the exact construction and arrangement of parts as shown in the drawings and to which the foregoing description has been mainly confined, but that the invention includes changes and modifications therein within the claims. It will be understood also that parts of the invention may be employed independently of other parts thereof or in connection with machines differing from that shown.

What is claimed is:—

1. The combination of means for advancing a strip of material, means for severing portions therefrom to form blanks, means for rolling the blanks to form tubes, a carrier for advancing the blanks to the rolling means, and cutting means for shaping the blanks while being advanced by the carrier, substantially as described.

2. The combination of means for rolling blanks to form tubes, a carrier for advancing the blanks to the rolling means, means for feeding partially formed blanks to the carrier, and cutting means for completing the shaping of the blanks while being advanced by the carrier, substantially as described.

3. The combination with means for rolling blanks to form tubes, of a blank feeding table, means for clamping a partially formed blank to the table, and means for completing the shaping of the blank while being advanced by the table, substantially as described.

4. The combination of means for advancing a strip of material, means for severing portions therefrom to form blanks, means for rolling the blanks to form tubes, a reciprocating blank feeding table for receiving the severed blanks, means for clamping the blanks to the table, and cutting means for shaping the blanks while being advanced by the table, substantially as described.

5. The combination of means for advancing a strip of material, means for severing portions therefrom to form blanks, means for rolling the blanks to form tubes, a blank feeding table for receiving the severed blanks, means for moving the table to feed the blanks, means for clamping the blanks to the table, and a shaping knife mounted to move with the table to shape one edge of the blank during the feeding movement of the table, substantially as described.

6. The combination of means for advancing a strip of material, means for severing portions therefrom to form blanks, means for rolling the blanks to form tubes, a reciprocating blank feeding table for receiving the severed blanks, means for clamping the blanks to the table, and a shaping knife mounted to move with the table to shape one edge of the blank during the feeding movement of the table, substantially as described.

7. The combination of means for advancing a strip of material, means for severing portions therefrom to form blanks, means for rolling the blanks to form tubes, a blank feeding table for receiving the severed blanks, means for moving the table to feed the blanks, means for clamping the blanks to the table, and a shaping knife mounted to move with the table to shape the rear edge of the blank during the feeding movement of the table, substantially as described.

8. The combination with means for rolling blanks to form tubes, of a blank feeding table, means for feeding the blanks to the table, means for clamping the blanks to the table, means for moving the table to feed the blanks, and a shaping knife mounted to move with the table for shaping the rear edge of the blank during the feeding movement of the table, substantially as described.

9. The combination with means for rolling blanks to form tubes, of a blank feeding table 40, a clamp 55, means for moving the table to feed the blanks, and a shaping knife 61 mounted to move with the table, substantially as described.

10. The combination with means for rolling blanks to form tubes, of means for advancing a strip of material, a severing knife 41 for cutting the strip on a line extending diagonally of the strip and curved convexly toward the main portion of the strip, a reciprocating table 40 for receiving the severed blanks, means for clamping the blanks to the table, and a curved knife 61 mounted to move with the table for cutting a tapering piece from the convexly curved rear edge of the blanks, substantially as described.

11. The combination with means for rolling blanks to form tubes, of a reciprocating table for advancing the blanks to the rolling means, means for feeding the blanks to the table with one edge of the table, and means for guiding the extending edge of the blank, substantially as described.

12. The combination with means for rolling blanks to form tapering tubes, of a reciprocating blank feeding table 40, means for feeding blanks to the table with one edge of the blank extending beyond a side edge of the table, a clamp 55 for clamping the blank to the support, means for raising the clamp to release the blank when it has been advanced to the rolling means, and guides 70 and 71 for the extending edge of the blank, the guide 71 having a part in position to be engaged by the clamp 55 whereby said guide will be lifted by the upward movement of the clamp, substantially as described.

13. The combination of an intermittently rotating tapering mandrel, a blank feeding table for presenting blanks to the mandrel to be wound thereon, and means for swinging the blank edgewise as it is being drawn on to the mandrel, substantially as described.

14. The combination of an intermittently rotating tapering mandrel, a blank feeding table for presenting blanks to the mandrel to be wound thereon, and a guiding flange 98 on the table for engaging the concavely curved edge of the blank to swing the blank edgewise as it is being drawn on to the mandrel, substantially as described.

15. The combination of an intermittently rotating tapering mandrel, a blank feeding table for presenting blanks to the mandrel to be wound thereon, means for feeding the blanks to the table with an edge extending beyond a side edge of the table, a guide for guiding the extending edge of the blank as it is advanced to the mandrel, and a guide for engaging the concavely curved edge of the blank to swing the blank edgewise as it is drawn on to the mandrel, substantially as described.

16. The combination of an intermittently rotating tapering mandrel, pressing means for co-acting with the mandrel in winding a blank thereon to form a tube, means for causing a relative longitudinal reciprocating movement between the mandrel and the pressing means for the delivery of the tube therefrom, means for stripping the tube from the mandrel, and a pressing finger for co-acting with the end of the mandrel beyond the said pressing means and adapted to act as a supplemental stripping device, substantially as described.

17. The combination of an intermittently rotating tapering mandrel, a plurality of pressing shoes for co-acting with the mandrel in winding a blank thereon to form a tube, means for causing a relative longitudinal reciprocating movement between the mandrel and the pressing shoes for the delivery of the tube therefrom, means for stripping the tube from the mandrel, and a pressing finger for co-acting with the end of the mandrel beyond the pressing shoes and adapted to act as a supplemental stripping device, substantially as described.

18. The combination of an intermittently rotating tapering mandrel, a plurality of independent self-adjusting shoes 95 for co-acting with the mandrel in winding a blank thereon to form a tube, means for causing a relative longitudinal movement between the mandrel and said shoes, and means for stripping the tube from the mandrel, substantially as described.

19. The combination of a tapering tube-forming mandrel, a holder for receiving the tube from the mandrel, means for causing a relative longitudinal reciprocating movement between the mandrel and the holder whereby the mandrel with the tube thereon is caused to enter the holder, said holder being provided with a shoulder for engaging the edge of the tube to strip the tube from the mandrel, substantially as described.

20. The combination of a tapering tube-forming mandrel, an expansible holder for receiving the tube from the mandrel, means for causing a relative longitudinal reciprocating movement between the mandrel and the holder whereby the mandrel with the tube thereon is caused to enter the holder, said holder being provided with a shoulder for engaging the edge of the tube to strip the tube from the mandrel substantially as described.

21. The combination with a tube forming mandrel, of a holder for receiving the tube from the mandrel, means for causing a relative reciprocating movement between the mandrel and the holder, said holder being provided with a yielding part having a shoulder adapted for engaging the edge of the tube to strip the tube from the mandrel, substantially as described.

22. In a tube making machine, the combination of a tapering forming mandrel, and a tube holder adapted to receive a tube from said mandrel, said holder being expansible and having a tapering entrance portion, a tapering holding portion and a shoulder between said portions, substantially as described.

23. In a tube making machine, the combination of a tapering forming mandrel, and a tube holder adapted to receive a tube from said mandrel, said holder being formed of yielding sections shaped to form a holder having a tapering entrance portion, a tapering holding portion and a shoulder between said portions, substantially as described.

24. In a tube making machine, the combination of a tapering forming mandrel, and a tube holder for receiving a tube from said mandrel, said holder being formed of sections 5 carried by arms 131 separable against yielding tension, substantially as described.

25. The combination with a tube forming mandrel, an intermittently moving carrier, a plurality of tube holders carried thereby for receiving the tubes from the mandrel, means for moving the mandrel longitudinally to deliver tubes to the holders, each tube holder being provided with means for stripping the tube from the mandrel, and a supplemental stripping device independent of the holders, substantially as described.

26. The combination with a tapering tube forming mandrel, an intermittently moving carrier, a plurality of tube holders carried thereby for receiving the tubes from the mandrel, each tube holder being provided with means for positively gripping the tube to strip it from the mandrel, substantially as described.

27. The combination with a tapering tube forming mandrel, an intermittently moving carrier, a plurality of tube holders carried thereby for receiving the tubes from the mandrel, means for moving the mandrel longitudinally to deliver tubes to the holders, each tube holder being provided with means for positively gripping the tube to strip it from the mandrel, and a supplemental stripping device independent of the holders, substantially as described.

28. The combination of means for feeding a strip of material, means for cutting blanks therefrom, means for rolling the blanks to form tubes, a carrier to which the tubes are delivered from the rolling means, means for applying coating material to the tubes while supported by the carrier, and means for discharging the tubes from the carrier, substantially as described.

29. The combination of means for feeding a strip of material, means for cutting blanks therefrom, means for rolling the blanks to form tubes, means for applying coating material to the tubes, and means for transferring the tubes from the rolling means to the coating means, substantially as described.

30. The combination of a tube forming mechanism, coating mechanism for applying coating material to the tubes, and means for transferring the tubes from the tube forming mechanism to the coating mechanism, substantially as described.

31. The combination of tube forming mechanism, means for supplying blanks to the tube forming mechanism, coating mechanism for applying coating material to the tubes, and means for transferring the tubes from the tube forming mechanism to the coating mechanism, substantially as described.

32. The combination of tube forming mechanism for rolling blanks to form tapering tubes, means for supplying blanks to the tube forming mechanism, coating mechanism for applying coating material to the small end of the tubes, and means for transferring the tubes from the tube forming mechanism to the coating mechanism, substantially as described.

33. The combination of tube forming mechanism, a carrier provided with a plurality of tube holders for receiving the tubes from the tube forming mechanism, means for transferring the tubes from the forming mechanism to the holders, coating mechanism for applying coating material to the tubes while supported by said holders, and means for discharging the tubes from the holders after the coating material applied to the tubes has had time to set, substantially as described.

34. The combination of an intermittently rotating longitudinally movable tapering mandrel, means for feeding blanks to the mandrel to be wound thereon to form tubes, a carrier provided with a plurality of tube holders, said holders being formed to hold the tubes by engagement with the larger end thereof, and said carrier being constructed to move the holders into position to hold the tubes vertical and small end downward for having coating material applied to their smaller ends, means for transferring the tubes from the mandrels and means for applying coating material to the smaller end of the tubes while so supported by the holders, substantially as described.

35. The combination of tube forming mechanism, a plurality of tube holders for receiving the tubes from the tube forming mechanism, means for transferring the tubes from the forming mechanism to the holders, means for moving the holders from receiving position into position to hold the tubes vertical to have coating material applied thereto, and means for applying coating material to the tubes, substantially as described.

36. The combination of tube forming mechanism, a tube holder for receiving tubes from the tube forming mechanism, means for transferring the tubes from the forming mechanism to the holders, means for moving the holder from receiving position into position to hold the tube vertical to have coating material applied thereto, and means for applying coating material to the tube, substantially as described.

37. The combination of tube forming mechanism for forming tapering tubes, a tube holder for receiving tubes from the forming mechanism and adapted to hold the tubes by engagement with the larger end thereof, means for transferring the tubes from the forming mechanism to the holders, means for moving the holder from receiving position into position to hold the tube vertical and small end downward for having coating material applied to its smaller ends, and means for applying coating material to the smaller end of the tube while so supported by the holder, substantially as described.

38. The combination of a horizontally arranged tube forming mandrel, a plurality of tube holders for receiving the tubes from the mandrel, means for transferring the tubes from the forming mandrel to the holders, means for moving the holders from receiving position to position to hold the tubes vertical to have coating material applied thereto, and means for applying coating material to the tubes, substantially as described.

39. The combination of tube forming mechanism, a vertically rotating carrier provided with a plurality of radially arranged tube holders for receiving the tubes from the forming mechanism and means for transferring the tubes from the forming mechanism to the holders, means for applying coating material to the tubes when they have been moved into vertical position by the rotation of the carrier, substantially as described.

40. The combination of a tapering tube forming mandrel, a vertically rotating carrier provided with a plurality of tube holders for receiving tubes from the mandrel, said holders being constructed to hold the tubes by engagement with the larger end thereof and with the smaller end pointing outward from the center of the carrier, means for transferring the tubes from the forming mandrel to the holders, and means for applying coating material to the tubes when they have been moved into vertical position by the rotation of the carrier, substantially as described.

41. The combination of a tapering tube forming mandrel, a vertically rotating carrier provided with a plurality of radially arranged tube holders for receiving tubes from the mandrel, said holders being constructed to hold the tubes by engagement with the larger end thereof, means for transferring the tubes from the forming mandrel to the holders, and means for applying coating material to the tubes when they have been moved into vertical position by the rotation of the carrier, substantially as described.

42. The combination of a carrier, a plurality of independently movable tube holders mounted on the carrier, means for applying coating material to tubes supported by the holders, and means for moving the holders relatively to the carrier to jar excess coating material from the tubes, substantially as described.

43. The combination of a carrier having a plurality of independently spring pressed tube holders, means for applying coating material to the tubes carried by the holders, and means for moving each holder against the tension of the spring and for releasing the holder after the coating material has been applied to the tube to jar excess coating material from the tubes, substantially as described.

44. The combination of a tube forming mechanism for rolling blanks to form tapering tubes, a carrier provided with a plurality of tube holders for receiving the tubes from the forming mechanism and adapted to hold the tubes by engagement with the larger end thereof, said carrier being adapted to move the holders from receiving position into position to hold the tubes vertically and small end downward to have coating material applied to the small end of the tubes, means for transferring the tubes from the forming mechanism to the holders, a receptacle for containing liquid coating material, and a reciprocating dipper for raising a portion of the coating material to immerse the end of the tubes therein, substantially as described.

In testimony whereof, I have hereunto set my hand, in the presence of two subscribing witnesses.

BENJAMIN W. TUCKER.

Witnesses:
A. L. KENT,
T. F. KEHOE.